United States Patent Office 3,119,246
Patented Jan. 28, 1964

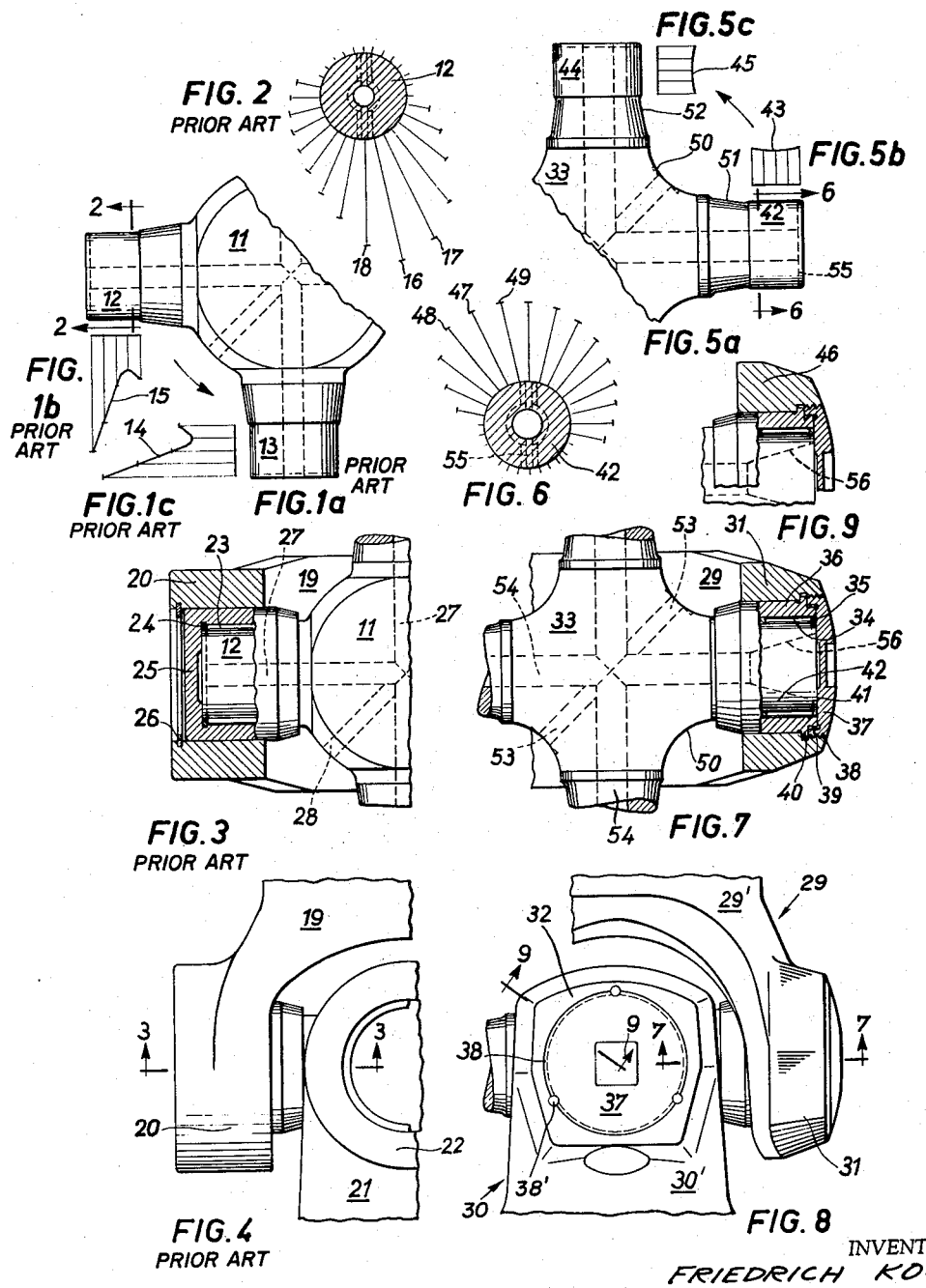

3,119,246
UNIVERSAL JOINT
Friedrich Koch, Friedrichshafen, and Karl Sailer, Friedrichshafen-Jettenhausen, Germany, assignors to Maybach-Motorenbau G.m.b.H., Friedrichshafen, Germany, a firm of Germany
Filed Apr. 30, 1962, Ser. No. 190,914
Claims priority, application Germany May 5, 1961
9 Claims. (Cl. 64—17)

This invention relates to a universal joint and more particularly to a universal joint for transmitting large power loads.

For transmitting power in heavy vehicles driven by internal combustion engines, drive shafts with universal joints are generally used. The universal joint of the present invention consists of two forked members having lugs at the end of the forks. Bearings are formed in these lugs and these bearings which may be provided with bushings support a cross link by means of cylindrical bearing pins on the cross link carried in the bearings formed in the lugs. The lugs may be coverless in which case each lug is made as one piece to enclose the bearing or the lugs may have a separate cover for enclosing the bearings.

Due to the increased power and speed of present day vehicles, particularly heavy rail motor cars, damage to these universal joints tends to occur more frequently. The damage occurs particularly at the ends of the bearings. In cases where needle bearings are used, such damage may be caused by breakage of the most stressed needles. Excessive wear resulting in damage to the bearings may also occur.

In an attempt to find the reason for such difficulties, a universal joint having needle bearings was subjected to a static torque and the distribution of the load on the needle bearings was observed. In order to do this, the cylindrical bearing pin of a cross link was plated with copper and a universal joint was assembled, using the cross link having the copper plated cylindrical bearing pin. The assembled universal joint was subjected to a maximum static torque equivalent to the maximum torque which it would be expected to transmit in actual service. Subsequently, the universal joint was disassembled in order that the impressions made by the needles in the copper plate could be observed. By measuring the width of these impressions made by the needles it was possible to determine the load at various points on the bearing. It was possible, therefore, to determine the load distribution around the circumference of the bearing and along the length of the needles.

In using the above testing procedure in testing a conventional universal joint it was noted that certain needles in the load region carried more load than other needles in the same region. It was also observed that the needle which carried the greatest load had a load distribution which varied along its length such that the load at the outer end of the needle was almost twice the average load. The load of the inner end of the needle was also greater than the load at the longitudinal center. Thus, there were peak loads along the length of the bearing and also along the circumference.

It is an object of the present invention to avoid and overcome the difficulties of and objections to prior art practices by providing an improved universal joint having bearings which are subjected to a more even load distribution.

Another object is to provide an improved universal joint for transmitting relatively heavy loads.

Yet another object is to provide an improved universal joint which is less likely to break and which is subject to reduced wear.

A further object is to provide an improved universal joint having bearings subjected to a substantially even load distribution along their longitudinal extension.

A universal joint constructed in accordance with the present invention provides a load distribution which eliminates the load peaks to which certain portions of the bearings of conventional universal joints are subjected. This is accomplished by making the four bearings supporting the four cylindrical bearing pins of the cross link elastically yielding so that the loads distributed to the four bearings and caused by the torque to be transmitted are equally distributed longitudinally as well as radially over the bearings surfaces.

One way of producing this result is to provide forked members having lugs wherein the lugs decrease in thickness as the outer side portions of the lug are approached. The portions of decreased thickness of the lugs are more resilient than the relative thick portions and they yield to the load which is in part transferred to the stiffer thick portions which contribute more to carrying the load than they do if there are no relatively thin portions. Therefore, the load carried by the bearings of the universal joint is substantially evenly distributed over the length of the bearings. A bearing bushing may be secured in the lugs. The thickness along radial cross sections of the lugs according to this invention is preferably increased in the direction from the center of the load region at both sides of the bearing pins and particularly toward the free end of the lug. By increasing the thickness in this way, the load carried by the bearings is more evenly distributed over the circumference of the bearing. With a construction according to this invention, the load is more evenly distributed in the universal joint, particularly in the power transmitting regions, so that the joint may be made smaller despite the high speeds and large power loads transmitted. The material of which the joint is made is more efficiently used and the joint can be made considerably lighter than a conventional universal joint transmitting the same power load at the same speed.

A second way of obtaining a resiliently yielding support of the bearing pins in the lugs of the forked members is to provide bushings in the lugs which bushings have a longitudinal portion whose outside surface tightly engages the respective lugs and which bushings have a second longitudinal portion whose outside surface is spaced from the lugs, said second portions being close to the outside of the lugs and therefore permitted to yield under the load.

Both systems may be combined, i.e. the cross section of the lug longitudinally of the bearing may be reduced toward the outside of the lug and the bushing may be only partly rigidly supported in the lug. If desired, the section of the lug radially of the bearing may be increased from the loaded region of the bearing toward the free end of the lug.

Uniformity of load distribution is also improved according to this invention by constructing the four legs of the cross link in a corresponding manner. To accomplish this, each of the four projecting legs of the cross link extends from a curved portion on the main body of the cross link and each leg is made up of a conical portion whose large diameter is close to the curved portion and whose smallest diameter is adjacent to the cylindrical bearing pin of the leg.

The cylindrical bearing pin of the legs may have an oil hole and a recess serving as a reservoir for a lubricant. The recess may be made so that it widens toward the outside whereby the cylindrical bearing pin with said widened recess also contributes to the uniformity of load distribution.

The aforesaid object of the present invention and other objects will become apparent as the description proceeds.

For a better understanding of the present invention reference should be had to the accompanying drawings wherein like numerals of reference indicate similar parts throughout the several views and wherein:

FIG. 1a is a partial side view of a cross link of known design for use in a universal joint.

FIGS. 1b and 1c are load distribution curves along the length of the cylindrical bearing pins of the known cross link of FIG. 1a.

FIG. 2 is a cross section of a trunnion of the known cross link taken along the line 2—2 of FIG. 1a, the load distribution around the circumference of the trunnion being indicated by radial lines.

FIG. 3 is a part-sectional end view of a portion of the known universal joint, the section being made along line 3—3 of FIG. 4.

FIG. 4 is a partial plan view of the universal joint of known design.

FIG. 5a is a partial side view of a cross link according to the present invention.

FIGS. 5b and 5c are load distribution curves along the length of the trunnion of the cross link shown in FIG. 5a.

FIG. 6 is a cross section of a trunnion taken along the line 6—6 of FIG. 5a, the load distribution around the circumference of the trunnion being indicated by radial lines.

FIG. 7 is a part-sectional end view of a portion of a universal joint according to the invention, the section being made along line 7—7 of FIG. 8.

FIG. 8 is a partial plan view of a universal joint according to the present invention.

FIG. 9 is a partial cross section taken along line 9—9 of FIG. 8.

FIGS. 1a to 4 are various views of a universal joint of known design.

The known cross link 11 in FIG. 1a has four projecting legs (only two shown) each having a cylindrical bearing pin 12, 13 (only two shown) adapted to be rotatably supported in the lugs 20, 22 (only two shown) of the forked members 19 and 21 by means of needle bearings 23. It will be noted from FIG. 3, that the lug 20 has a rectangular cross section. The needle bearing 23 is carried in a cage 24 of the bushing 25. The bushing 25 is pressed into the lug 20 and secured with a snap ring 26. A lubricant is supplied through holes 27 and 28. The load distribution along the length of the most stressed needle of the needle bearings 23 on the cylindrical bearing pins 12 and 13 is indicated by the curves 14 and 15 of FIGS. 1c and 1b. It will be noted from the curves 14 and 15 that the load at the outer end of the needle bearing 23 is almost twice the average load while the load at the inner end of the needle bearing 23 also increases.

In FIG. 2, which is a section through the cylindrical bearing pin 12, the lengths of the radially extending lines, three of which are identified by the numerals 16, 17 and 18, represent the load distribution around the circumference of the cylindrical bearing pin 12. More particularly these radial lines indicate the total load on each needle of the needle bearing 23. It can be seen in FIG. 2 that the total load 16 on the needle in the load region is greater than the total load 17 and 18 on the adjoining two needles. Consequently, the load distribution over the circumference of the bearing also has an undesirable peak.

A universal joint according to the present invention is shown in FIGS. 5a to 9. In these figures two identical forked members 29 and 30 having four lugs 31 and 32 (only two shown) are provided. A cross link 33 having four projecting legs is supported in the four lugs 31 and 32 (only two shown). The bearings for supporting the cross link 33 in the lugs each consist of needles 34 in a cage 35 and a bushing 36. The bushing 36 has a first part whose outer surface tightly engages the bore in the lug and has a second part whose outer surface is spaced from the lug. This second portion is close to the outside of the lug and may yield under the load. The bushing 36 is pressed into the lug 31 by a threaded cover 37 and the cover is prevented from coming loose by providing calking between the threaded cover 37 and the lug 31 at several points along the circumference as indicated by the small circles 38' in FIG. 8. A surface 39 on the cover 37 bears on a collar 40 of the bushing 36 to provide a clearance of several hundredths of a millimeter between the inner face 41 of the cover 37 and the end face of the cylindrical bearing pin 42 of the cross link 33.

The cross section of the lug, as indicated by the numeral 31 in FIG. 7 decreases in thickness from the inside face to the outside face of the lug. Because of this decreasing thickness and the looseness of the portion of the bearing bushing at the outside of the lug, the outside portion of the lug yields to the relatively great load thereat and part of the load is transferred to the relatively thick and stiff inside face portion of the lug and the load is evenly distributed over the length of the bearing. This can be seen on the curve 43 in FIG. 5b wherein the ordinate represents the magnitude of the load on the most stressed needle and the abscissa represents various positions along the length of the bearing. The load on the needle bearing is caused by the fact that the fork member 30, which is connected to the cylindrical bearing pin or trunnion 44 of the cross link 33, tends to rotate the cross link 33 in the direction of the arrow shown in FIG. 5a such that the load is transmitted to the cylindrical bearing pin or trunnion 42.

The load distribution of the most stressed needle in the bearing on the cylindrical bearing pin 44 is shown by curve 45 in FIG. 5c. It can be seen from the curves 43 and 45 that the load is distributed substantially evenly over the length of the bearings and that there are no areas of peak load as found in the known design of FIGS. 1a to 4.

In order to provide uniform load distribution around the circumference of the bearing, the thickness along radial cross sections of the lugs 31 and 32 is also increased from the load region towards the sides of the lugs, particularly towards the free end of the lugs, but also toward the root portions 29' and 30' of the lugs. This increase in thickness can be seen by comparing the thickness of the radial cross sections indicated by the numerals 31 and 46 shown in FIGS. 7 and 9. It will be noted from these figures that the thickness of radial cross section 46 in FIG. 9, which corresponds to the section 9—9 in FIG. 8 and is a radial cross section between the maximum load region and the free end of the lug, is greater than the radial cross section at the maximum load region as indicated by the numeral 31 in FIG. 7.

The radially extending lines in FIG. 6 represent the load distribution in the needle bearing on the cylindrical bearing pin or trunnion 42 when the cross link 33 is rotated in the direction of the arrow in FIG. 5a. The load region is represented by the radial lines 47, 48 and 49. These radial lines in FIG. 6 indicate the load on the individual needles which make up the bearing. It can be seen in FIG. 6 that the loads represented by the radial lines 47, 48 and 49 in the load region are substantially equal, thereby indicating that the load distribution in the load region is more uniform than the load distribution in the known universal joint of FIGS. 1 to 4.

The extent of the increase and decrease of the radial and longitudinal thickness of the lugs may be determined by trial and error. As seen in FIG. 7, only about two thirds of the total length of the bushing 36 tightly engages the lug. The outer end of the bushing is centered only by frictional engagement with the cover 37.

Uniformity of load distribution is also improved by constructing the four projecting legs of the cross link 33 so that each of the projecting legs extends from a curved root portion 50 on the main body of the cross link 33 and each leg is made up of a substantially cylindrical bearing pin 42, 44 (only two shown) and a conical portion 51, 52 (only two shown), with the smallest diameter of the conical portions 51, 52 being closest to the free end of the projecting legs.

The needle bearing 34 as well as the clearance between the cover plate 37 and the end of the cylindrical bearing pin 42 may be supplied with lubricant through the passageways 53 and 54. The lubricant will pass to the end faces of the cylindrical bearing pins 42 and 44 and in the radial grooves 55 at the end of the cylindrical bearing pins 42 and 44.

The cylindrical bearing pins may be provided with a recess that widens towards the outer end of the cylindrical bearing pins. The recess may serve as a lubricant reservoir while at the same time it also contributes to the uniform load distribution in the bearings.

The invention hereabove described may be varied in construction within the scope of the claims.

We claim:

1. A universal joint, comprising two forked members, each of said forked members having a pair of lugs, bearing means in each of said lugs, a cross link supported in said bearing means, each of said lugs having an inside face, an outside face and a free end, each of said lugs being so constructed that the thickness defined by the transverse cross section of each lug decreases from said inside face to said outside face such that the load carried by each bearing means is substantially evenly distributed along the longitudinal extension of each bearing means, each of said lugs also being so constructed that the thicknesses defined by the radial cross sections of each of said lugs increase at both sides of said bearing means from the loaded circumferential portion of each of said bearing means toward the free end of each of said lugs such that the load carried by the bearing means along the circumferential load region is substantially evenly distributed.

2. A universal joint as set forth in claim 1 wherein each of said bearing means includes a bearing bushing carried in one of said lugs and having a portion having an outside surface tightly engaging the lug and having a portion having an outside surface spaced from the lug.

3. A universal joint according to claim 2 wherein said portion of said bushing which is spaced from the lug is adjacent to the outside face of the lug.

4. A universal joint, comprising two forked members, each of said forked members having a pair of lugs, bearing means in each of said lugs, a cross link supported in said bearing means, each of said lugs having a root portion, an inside face, an outside face and a free end, each of said lugs being so constructed that the thickness defined by the transverse cross section of each lug decreases from said inside face to said outside face such that the load carried by each bearing means is substantially evenly distributed along the longitudinal extension of each bearing means, each of said lugs also being so constructed that the thicknesses defined by the radial cross sections of each of said lugs increase at both sides of said bearing means from the loaded circumferential portion of each of said bearing means toward the free end of each of said lugs and toward the root portion of said lugs such that the load carried by the bearing means along the circumferential load region is substantially evenly distributed.

5. A universal joint as defined in claim 4 wherein the portion of said lugs wherein said bearing means is located has a shape resembling the frustum of a four-sided pyramid.

6. A universal joint for transmitting torque comprising two forked members, each of said members having a pair of lugs, bearing means in each of said lugs, a cross link carried in said bearing means, each of said lugs being so constructed that the thicknesses defined by transverse cross sections of each lug decrease from the inside to the outside of the lug such that the load carried by each bearing means due to the torque transmitted is substantially evenly distributed over the longitudinal extension of each bearing means, each of said lugs also being so constructed that a portion of the radial thickness of each lug increases at both sides of said bearing means from the loaded region of the bearing means as the free end of said lug is approached such that the load due to the torque transmitted is substantially evenly distributed over the circumference of each bearing means.

7. A universal joint according to claim 6 wherein said cross link has a central portion and four projecting legs, the free end of each projecting leg having a cylindrical bearing pin carried in said bearing means, each of said legs extending from a curved portion of said central portion of said cross link, each of said legs having a conical portion which decreases in size toward the free end of each leg.

8. A universal joint comprising two forked members, each of said members having a pair of lugs, bearing means in each of said lugs, a cross link carried in said bearing means, said lugs being so constructed that the transverse thickness of each lug decreases from the inside to the outside of each lug and the radial thickness of each lug increases from the loaded region of the bearing means toward the free end of each lug at both sides of said bearing means such that the load is substantially evenly distributed over the circumference of said bearing means, said cross link having projecting legs, said projecting legs having cylindrical bearing pins carried in said bearing means, said projecting legs having lubricant reservoirs, said reservoirs increasing in size toward the free end of said legs to thereby contribute to the uniform load distribution over the bearing means.

9. A universal joint as set forth in claim 8 wherein said reservoirs are in said cylindrical bearing pins of said legs.

References Cited in the file of this patent

UNITED STATES PATENTS

| | | |
|---|---|---|
| 1,989,832 | Swenson | Feb. 5, 1935 |
| 2,209,854 | Slaght | July 30, 1940 |
| 2,903,868 | Stillwagon | Sept. 15, 1959 |